Jan. 4, 1944.   E. MARTIN   2,338,293
METHOD AND APPARATUS FOR BALANCING PROPELLERS
Filed Sept. 27, 1941
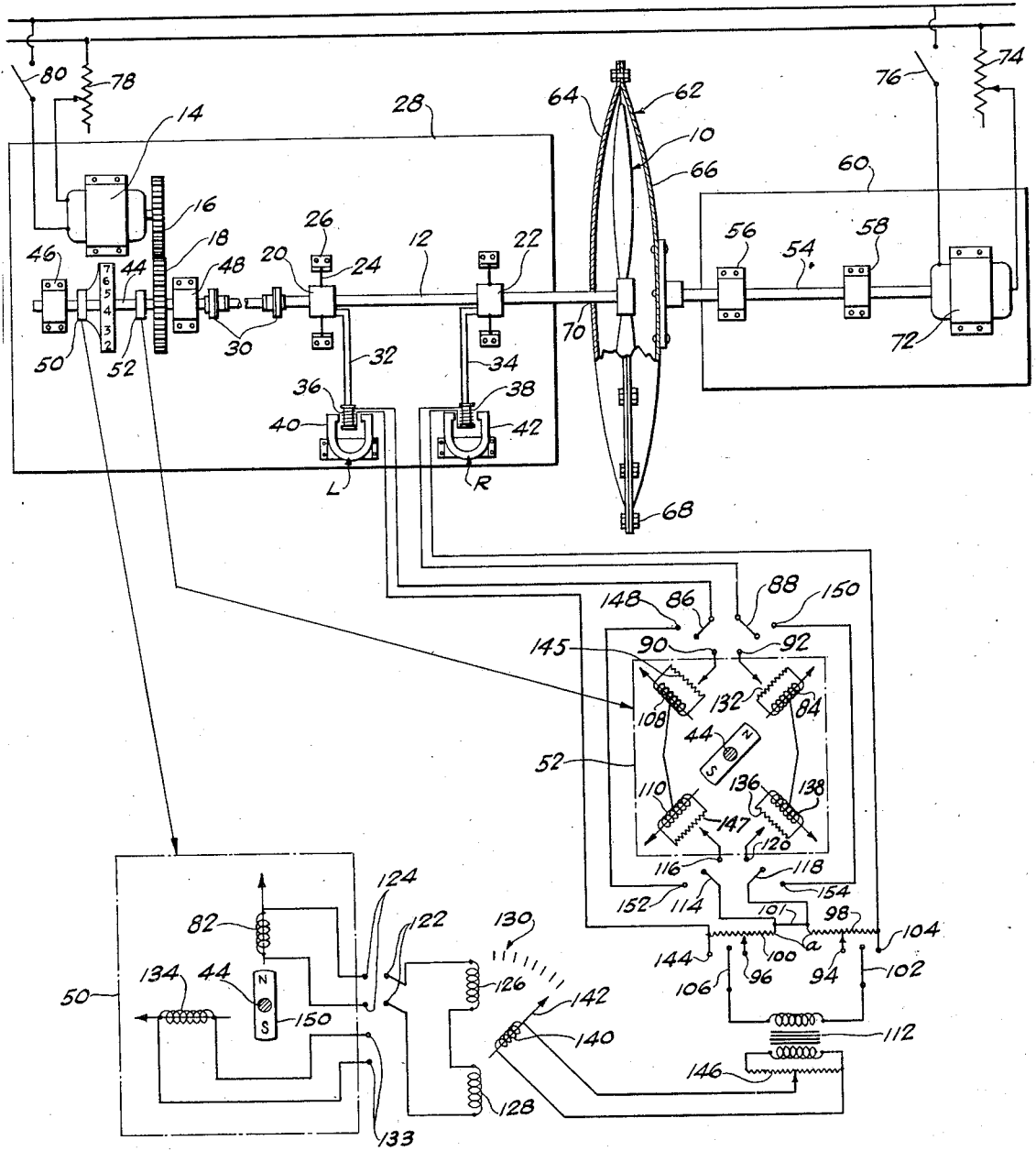
INVENTOR
*Erle Martin*
BY
*Harris G. Luther*
ATTORNEY Patented Jan. 4, 1944

2,338,293

UNITED STATES PATENT OFFICE 2,338,293

METHOD AND APPARATUS FOR BALANCING PROPELLERS

Erle Martin, West Hartford, Conn., assignor to United Aircraft Corporation, East Hartford, Conn., a corporation of Delaware Application September 27, 1941, Serial No. 412,655

7 Claims. (Cl. 73—53)

This invention relates to an improved method and apparatus for balancing rotating bodies to eliminate vibrational effects therefrom and has particular reference to an improved method and apparatus for balancing a rotating body having aerodynamic characteristics, such as an aeronautical propeller.

An object of the invention resides in the provision of an improved method and apparatus for separately measuring the mass and aerodynamic vibration producing characteristics of such a body so that these defects can be independently corrected to provide a body having substantially perfect balance both as to mass and aerodynamic characteristics.

A further object resides in the provision of a suitable apparatus by means of which the aerodynamic defects of a rotating body having aerodynamic characteristics can be eliminated while the effects of mass unbalance of the body are measured and corrected.

Other objects and advantages will be more particularly pointed out hereinafter or will become apparent as the description proceeds.

In the accompanying drawing, in which like reference numerals are used to designate similar parts throughout, there is diagrammatically illustrated a suitable apparatus for the purpose of disclosing the invention. The drawing, however, is for the purpose of illustration only and is not to be taken as limiting or restricting the invention since it will be apparent to those skilled in the art that various changes in the illustrated arrangement may be resorted to without in any way exceeding the scope of the invention.

In the accompanying drawing, the single figure is a diagrammatic illustration of an apparatus for separately detecting and measuring the effects produced by aerodynamic and dynamic unbalance of a rotatable body such as an aeronautical propeller.

In the manufacture of aeronautical propellers according to modern practice, methods have been developed for balancing the propellers both statically and dynamically to a high degree of precision to eliminate propeller induced vibrations in aircraft power plants. It has been found, however, that an aeronautical propeller which is perfectly balanced mechanically during manufacture so that it does not cause any appreciable vibration at low altitudes may become the source of undesirable vibrations when placed on an airplane and operated at high altitudes. This is due to the fact that an aerodynamic defect can be balanced out by a redistribution of mass for any one altitude but, when the altitude, and consequent air density, is varied, the aerodynamic forces vary in proportion while the mass distribution forces remain substantially constant so that a mass distribution which counterbalances an aerodynamic defect at one altitude does not have that effect at a different altitude. In order to overcome this difficulty it, therefore, becomes necessary to provide the propeller initially with substantially perfect mass and aerodynamic balance. Since the effect of mass and aerodynamic unbalance occur at the same time and have substantially the same or at least overlapping amplitudes, in order to correct both of these defects it becomes necessary to provide some means for separately indicating the defects quantitatively and positionally and it is among the objects of this invention to provide such a means together with an illustrative method of using such means to accomplish the result indicated.

Referring to the drawing in detail, the numeral 10 generally indicates a propeller the defects of which are to be measured and corrected. This propeller is mounted upon a shaft 12 driven by a motor 14 through a suitable driving connection, as indicated by the gears 16 and 18. The shaft 12 is supported in special bearings, as indicated at 20 and 22, supported for freedom of lateral movement by suitable means, such as the flexible suspension member 24 extending from the bearing to rigid anchor members 26 which are in turn supported on a suitable platform or machine base 28. In the arrangement illustrated in which the propeller overhangs both of the bearings, the bearing 22 next to the propeller would be arranged to carry a downwardly directed load while the bearing 20 remote from the propeller would be arranged to carry an upwardly directed load. These bearings may be of the type shown in the Gisholt Machine Company catalog referred to below. Suitable means, not illustrated, are provided to carry the load incident to forces acting axially of the shaft 12 in either direction and a suitable flexible connection 30 is provided between the motor drive and the portion of the shaft carried by the bearings 20 and 22 to avoid any vibrational forces being imposed on the bearing by the motor or its drive. Arms, as indicated at 32 and 34, project laterally from the bearings 20 and 22 respectively and at their outer ends carry electric induction coils 36 and 38 respectively disposed between the poles of respective permanent magnets 40 and 42 rigidly supported on the platform or base 28 so that any lateral movements of the bearings 20 and 22 will induce resultant electric current in the respective coils 36 and 80.

A shaft 44 carried by suitable bearings 46 and 48 and connected with the shaft 12 through the flexible coupling 30 carries two electric current impulse generators 50 and 52 the construction and purpose of which will later appear. In the following description the generator 50 will be referred to as a measuring generator and the generator 52 will be referred to as a compensating generator.

A shaft 54 coaxial with the shaft 12 and supported in suitable bearings 56 and 58 mounted on a platform or machine base 60 carries a shroud, generally indicated at 62, adapted to completely enclose the propeller 10. The shroud 62 is formed of two separable parts 64 and 66 secured together by some suitable means such as the bolts 68 extending through respective circumferential flanges on the two shroud portions. One of these portions, for example, the portion 64, is provided with a concentric aperture 70 through which the propeller supporting shaft 12 extends with sufficient clearance so that the shaft will not strike the edge of opening 70 when the propeller vibrates the maximum amount permitted by the bearings 20 and 22.

While a simplified form of propeller enclosing shroud has been diagrammatically illustrated, this shroud may take any desired or convenient form and suitable means for supporting the shroud and securing the two portions together so that they can be easily separated for the purpose of mounting and dismounting the propellers therein, may be provided without in any way exceeding the scope of the invention.

The shaft 54 is driven by a motor 72 which is preferably provided with a speed regulating control 74 in addition to the switch 76 for making and breaking the motor circuit. The motor 14 may also, if desired, be provided with a speed control device 78 in addition to the switch 80 for making and breaking the circuit of this motor.

With this arrangement, when the propeller is enclosed in the shroud 62 and the shroud is rotated with the propeller at approximately the same speed, the aerodynamic effects of the propeller are eliminated and it may be considered that any vibrational effects caused by the propeller are due to defects in the mass balance of the propeller. After the defects in the mass balance have been corrected and the propeller rotates with the shroud without producing substantial vibration, the shroud may be removed from the propeller and any vibrational effects then produced by the propeller may be assumed to be caused by aerodynamic defects which defects may then be corrected by properly adjusting the angles of the various propeller blades, usually a suitable adjustment of one blade of a two or three bladed propeller being sufficient to substantially eliminate these vibrational effects. When both of the above indicated corrections have been made the propeller should be in a condition of substantially perfect mass and aerodynamic balance.

In the illustrated apparatus for quantitatively and positionally indicating the propeller defects one form of device marketed by the Gisholt Machine Company of Madison, Wisconsin, U. S. A., for measuring out of balance effects in rotating bodies is utilized. For a complete description of the theory and operation of such an apparatus reference may be had to descriptive literature published by this company and particularly to their catalogue "Balancing Machines," Form 1079. It is to be understood that the vibration detecting apparatus illustrated in the accompanying drawing and hereinafter briefly described is shown only for the purpose of disclosing the invention and that any other suitable apparatus for this purpose may be substituted for the one so illustrated and described without in any way exceeding the scope of the invention.

In determining the magnitude and position of the effective mass unbalance of the propeller the following procedure may be followed:

The movable field or stator of the measuring generator 50 is moved to its zero degree angular position so that the zero degree coil 82 of this generator and the zero degree coil 84 of the compensating generator 52 will produce a current and a voltage, respectively, exactly in phase with each other. The switches 86 and 88 are positioned in contact with the terminals 90 and 92 so that, when the propeller 10 is rotated, electric current impulses from the electrical pick-up will be fed into the measuring system. This position of the switches 86 and 88 also places the compensating generator 52 in the electrical circuit so that the voltages produced by the stator coils of this generator will be in series with the voltages generated in the electric pick-ups. The movable elements 94 and 96 of the respective potentiometers 98 and 100 will now be moved to the position indicated by $a$ at the opposite ends of the connector 101, the switch 102 will be moved into contact with the terminal 104 and the switch 106 will be moved into contact with the terminal 96, switch 122 will be closed to terminal 124, switch 114 will be closed to terminal 116 and switch 118 will be closed to terminal 120 so that the right hand pick-up, generally indicated by the letter R and the pair of coils 84 and 138 of the compensating generator will be placed in circuit with the amplifying device 112. With 106 connected to 96, positioning 96 at $a$ will effectively block out any electrical impulses generated by the left hand pick-up generally indicated by L. Now, with the switch 122 in position to contact the terminals 124 and connect the coil 82 of the measuring generator 50 with the current coils 126 and 128 of the wattmeter 130, the wattmeter will indicate watts generated in the pick-up R which are in phase with the current generated in coil 82 and will indicate watts generated in the coil 84 of the compensating generator 52. By now adjusting the potentiometer 132 which is in series with the coil 84, it is possible to make the resultant voltage zero and thus obtain a zero reading on the wattmeter 130. Under these conditions, the coil 84 of the compensating generator will be producing a voltage in phase with the zero degree component of the voltage output of the electric pick-up R and of exactly the same magnitude.

After the above mentioned zero reading of the wattmeter has been obtained switch 122 should be moved to contact the terminals 133 and connect the coil 138 of the measuring generator with the wattmeter so that the wattmeter will now measure the remaining components of the watts generated by the electric pick-up R. The potentiometer 136 across the remaining coil 138 of the pair of coils 84 and 138 of the compensating generator is now adjusted to again reduce the wattmeter reading to zero. With this arrangement the voltage generated by the electrical pick-up R is exactly compensated by the component voltages generated in the coils 84 and 138 of the compensating generator 52 so that no current is passed through the movable coil 140 of the wattmeter to move the pointer 142. Now, if switches 102 and 106 are moved to contact the terminals 94 and 144 and a similar procedure is followed in adjusting the potentiometers 145 and 147 across the coils 108 and 110, respectively, of the compensating generator, it will be possible to exactly compensate for the voltage being generated in the pick-up L. The machine has now been adjusted so as to be electrically balanced, that is, the compensating elements of the machine are so adjusted as to simulate the condition which would exist if a propeller having perfect mass and aerodynamic balance were mounted on the shaft 12.

Now, the shroud 62 is temporarily removed and an unbalance is introduced into the system by adding a small weight to the propeller in a predetermined plane parallel to the plane of rotation of the propeller and a known distance from the axis of rotation and in line with the zero degree rotational position of the propeller as determined by the location of the field coils and rotor of the measuring generator 50. When the propeller is rotated with the shroud replaced this unbalance will cause additional movement of both pick-ups R and L and cause additional voltages to be generated by these pick-ups in phase with the current generated in coil 82 of the measuring generator 50. With the compensating generator remaining in the circuit the switch 122 is again positioned to contact the terminals 124 to connect the coil 82 of the measuring generator with the fixed or current coils of the wattmeter and switch 102 is returned to contact with the terminal 104 while switch 106 is returned to contact with the terminal 96 to again place the right hand pick-up R in the circuit. The wattmeter should now be made to read zero by adjusting the potentiometer 100 which will in effect utilize some of the voltage induced by the pick-up L to oppose the voltage of pick-up R. Under these conditions the zero wattmeter reading indicates that a sufficient portion of the output of the pick-up L, which is in electrical opposition with the pick-up R, has been combined with the latter to completely nullify it. Thus, there will be no indication in pick-up R of unbalance in the plane of the added weight. The unbalance first added is now removed and a second known unbalance is placed on the propeller at a known distance from the axis of rotation in a different plane parallel to the plane of propeller rotation and in line with the zero degree rotational position of the machine the shroud being removed for this operation and replaced. The wattmeter will now indicate unbalance in the plane of this new weight. By adjusting the variable potentiometer 146 the wattmeter reading may now be changed or calibrated to read this known unbalance in any desired unit.

Similar nullification and calibration operations may be carried out for unbalance in the plane of the first added weight by adjusting moving switches 102 and 106 to contacts 94 and 144, respectively, and the potentiometer 98 to give a zero indication on the wattmeter of the unbalance produced by the newly added weight. The shroud is again removed from the propeller and the second weight is removed and the first weight is again put in position on the propeller and the potentiometer 100 is again adjusted to cause the wattmeter 130 to read this known unbalance in a desired correction unit.

The machine has now been completely calibrated and if both of the trial weights are removed and the shroud replaced around the propeller and the switches 86 and 88 move into contact with the terminals 148 and 150, respectively, and the switches 114 and 118 moved into contact with the terminals 152 and 154, respectively, and the propeller rotated, the compensating generator 52 will be taken out of the circuit and it will be possible to exactly determine the amount and angular position of the original unbalance in the planes of the added trial weights. For example, in order to find the effect of initial unbalance in the plane of the first trial weight, switches 102 and 106 are moved to contact the terminals 104 and 96, respectively, and the switch 122 is moved to contact the terminals 133 to connect the coil 134 of the measuring generator with the wattmeter 130. If now a reading is observed on the wattmeter the stator of the measuring generator is rotated until a zero reading on the wattmeter is obtained. The angular position indicated by this changed position of the stator of the measuring generator will indicate directly the angular position of the unbalance in the selected plane of correction. If switch 122 is now thrown to contact the terminals 124 and connect the coil 82 with the wattmeter the current and voltage introduced to the wattmeter will be in phase and the wattmeter will indicate directly in the selected units of correction the amount of unbalance to be compensated for in the selected plane of correction.

If now the switches 102 and 106 are moved to contact the terminals 94 and 144, respectively, and the switch 122 is changed to contact the terminals 133 and potentiometer 146 is returned to the position determined during calibration with the second trial weight, the stator of the measuring generator may be again moved to give a zero wattmeter reading thereby indicating the angular position of the unbalance in the other plane of correction. Changing the position of the switch 122 to now connect the coil 82 of the measuring generator with the wattmeter will indicate the amount of correction to be made in this other plane of correction in the selected units of correction.

After the indicated mass corrections in the two planes have been thus determined, the shroud will be removed and weight added to the propeller of the indicated amount and at the indicated positions or, in some cases, weight may be removed from the propeller in the indicated amounts and at positions diametrically opposite the locations in which weight would be added according to the first method.

After the mass unbalance of the propeller has been corrected with the propeller rotating in the rotating shroud 62, the shroud is removed and the propeller rotated independently. By a repetition of the above process the apparatus may now be calibrated for aerodynamic unbalance by changing the aerodynamic characteristics such as the pitch angle of one of the blades by a known amount instead of adding a trial weight and, after the position and magnitude of the aerodynamic unbalance is determined by the above-described method, one or more of the blades is adjusted until the aerodynamic unbalance is eliminated. When this has been accomplished the propeller will be in complete mass and aerodynamic balance.

While a particular method and apparatus has been hereinabove described and a suitable apparatus has been diagrammatically illustrated for the purpose of disclosing the invention, it is to be understood that the invention is not limited to the particular method and apparatus so illustrated and described, but that such changes in the nature and sequence of the various steps of the improved method and in the construction and arrangement of the various parts of the apparatus may be resorted to as come within the scope of the sub-joined claims.

Having now described the invention so that others skilled in the art may clearly understand the same, what it is desired to secure by Letters Patent is as follows:

1. Apparatus for determining the mass and aerodynamic unbalance of rotating bodies having aerodynamic characteristics comprising, means for indicating the magnitude and angular location of disturbing forces incident to both mass and aerodynamic unbalance at variable rotative speeds, and means for eliminating aerodynamic effects at any rotative speed including rotatable means enclosing said rotating body and rotating at substantially the same speed and in the same direction as said body for rotating the air surrounding said body to thereby substantially eliminate relative movement between the propeller and the surrounding air while the disturbances due to mass unbalance are being measured.

2. Apparatus for determining the mass and aerodynamic unbalance of rotating bodies having aerodynamic characteristics comprising, means for indicating the magnitude and angular location of disturbing forces incident to both mass and aerodynamic unbalance, and means comprising a shroud enclosing and rotatable with said rotating body at the same speed and in the same direction therewith for eliminating aerodynamic effects by rotating the air surrounding said rotating body while the disturbances due to mass unbalance are being measured.

3. Apparatus as set forth in claim 2 in which said shroud is separable and removable from its position enclosing said rotating body.

4. The method of balancing aeronautical propellers which comprises, eliminating aerodynamic effects from the operation of said propeller by causing the body of air immediately surrounding the propeller to rotate with the propeller at the same speed and in the same direction therewith, measuring the disturbing forces due to mass unbalance of the propeller while rotating with said aerodynamic effects eliminated, correcting the mass unbalance by a re-distribution of the propeller mass, restoring the aerodynamic effects, measuring the disturbing forces of said mass corrected propeller while rotating with said aerodynamic effects restored, and correcting the aerodynamic unbalance of said propeller by changing the aerodynamic effect of at least one of the propeller blades.

5. The method of balancing aeronautical propellers which comprises, eliminating aerodynamic effects from the operation of said propeller by enclosing said propeller in a hollow shroud rotatable with the propeller at the same speed and in the same direction therewith, measuring the disturbing forces due to mass unbalance of the propeller while rotating therein, correcting the mass unbalance by a re-distribution of the propeller mass, restoring the aerodynamic effects by removing said propeller from said enclosing shroud, measuring the disturbing forces of said mass corrected propeller while rotating with said shroud removed, and correcting the aerodynamic unbalance of said propeller by changing the pitch angle of at least one of the propeller blades.

6. The method of balancing aeronautical propellers which comprises, rotating said propeller within a shroud rotating with said propeller at the same speed and in the same direction therewith, measuring the disturbing forces due to mass unbalance of the propeller while rotating within said rotating shroud, correcting the mass unbalance by a re-distribution of the propeller mass, removing said shroud, measuring the disturbing forces of said mass corrected propeller while rotating without said shroud, and correcting the aerodynamic unbalance of said propeller by changing the aerodynamic effect of at least one of the propeller blades.

7. Apparatus for determining the mass and aerodynamic unbalance of rotating bodies having aerodynamic characteristics comprising, means for indicating the magnitude and angular location of disturbing forces incident to both mass and aerodynamic unbalance, and means comprising a shroud enclosing said rotating body and rotatable therewith at the same speed and in the same speed and in the same direction for eliminating aerodynamic effects while the disturbances due to mass unbalance are being measured and a separate support and a controllable speed drive for said shroud.

ERLE MARTIN.